United States Patent [19]

Pinson

[11] 4,212,188
[45] Jul. 15, 1980

[54] APPARATUS FOR FORMING SHEET METAL

[75] Inventor: George T. Pinson, Huntsville, Ala.

[73] Assignee: The Boeing Company, Seattle, Wash.

[21] Appl. No.: 4,422

[22] Filed: Jan. 18, 1979

[51] Int. Cl.² ............................................. B21D 11/20
[52] U.S. Cl. ............................................. 72/413; 72/446
[58] Field of Search ............... 72/413, 446, 448, 478, 72/481, 7, 19

[56] References Cited

U.S. PATENT DOCUMENTS

| 39,886 | 9/1863 | Cochrane | 72/413 |
|---|---|---|---|
| 483,094 | 9/1892 | Ansted | 72/413 |
| 1,331,630 | 2/1920 | Elkins | 72/413 |
| 1,465,152 | 8/1923 | Williams | 72/413 |
| 1,826,783 | 10/1931 | Hess | 72/413 |
| 2,334,520 | 11/1943 | Walters | 72/413 |

FOREIGN PATENT DOCUMENTS 1203308  7/1959  France ........................................ 72/413

Primary Examiner—Francis S. Husar
Assistant Examiner—Gene P. Crosby
Attorney, Agent, or Firm—Thomas H. Murray

[57] ABSTRACT

Apparatus is provided for forming sheet metal utilizing two opposed sets of rams placed in matrix arrays with corresponding rams of opposite sets in alignment. The rams are individually movable and are positioned so that their extremities define a surface having the desired configuration. The two sets of rams are then used to form a workpiece in the same manner as dies. Pivotally mounted work-engaging heads with rounded surfaces are provided on the rams to improve the surface finish of the workpiece.

5 Claims, 6 Drawing Figures

U.S. Patent    Jul. 15, 1980    Sheet 2 of 2    4,212,188
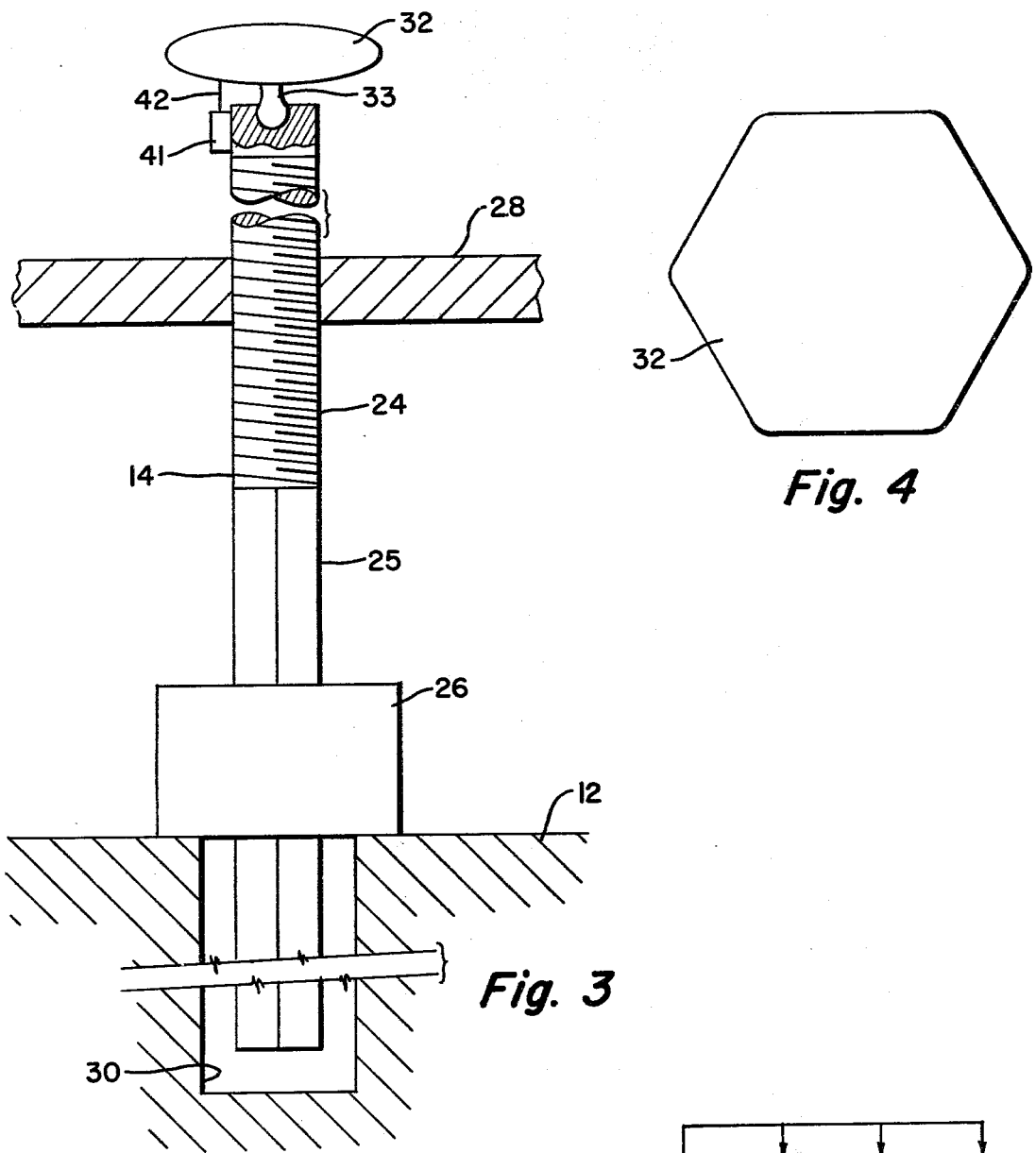
Fig. 3
Fig. 4
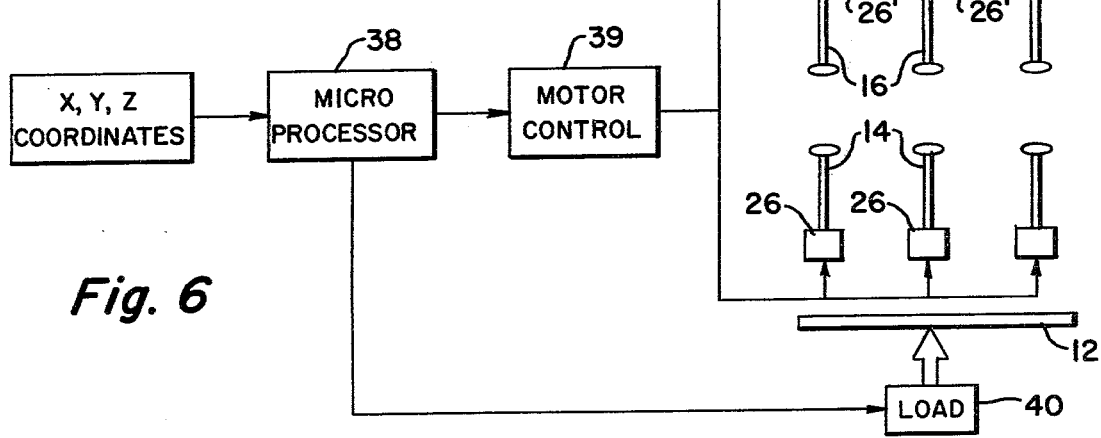
Fig. 6

4,212,188

APPARATUS FOR FORMING SHEET METAL

BACKGROUND OF THE INVENTION

The present invention relates to apparatus for forming sheet metal parts, especially where only one or a few parts of complex contour are to be produced.

Many sheet metal parts are made of die forming a sheet metal blank to a complex three-dimensional curved surface. This requires the use of dies, or die sets, which must be very accurately made, and the workpiece is placed between male and female dies and formed to the desired shape by stamping or pressing. The making of such dies with the necessary dimensional accuracy is a difficult and exacting process, requiring highly skilled tool and die makers and much time. The cost of the dies is correspondingly high. When a large number of identical parts is to be made, the cost of the dies is acceptable, but when only one or a few parts are to be made, the cost of the dies becomes expensive and is frequently prohibitive. In some cases, a female die only can be used with such techniques as explosion forming, but this is not always satisfactory and still involves the cost of at least one die. In some cases, it has been possible to approximate the desired complex curves by a series of straight bends on a standard bending machine; while in other cases, a wooden or metal die may be prepared and the sheet metal part hand-formed around the die. Some parts may be hand-formed without dies with suitable tools by sufficiently skilled craftsmen. All of these expedients, however, either compromise the design, that is, undesirably change or modify the desired configuration, or require the use of highly skilled and expensive labor, or both, so that they do not represent satisfactory solutions to the problem.

SUMMARY OF THE INVENTION

The present invention provides apparatus for forming sheet metal parts which eliminates the use of specially-made and expensive dies and which can be programmed to produce sheet metal shapes of any degree of complexity accurately and at low cost even if only one part is to be produced.

In accordance with the invention, the usual dies are eliminated and are replaced by two arrays of opposed, movable rams. The rams are disposed in matrix arrays on suitable supports and may or may not be in alignment with each other, depending upon requirements. Each ram is individually movable, as by means of a motor, and the rams are individually positioned so that the upper extremities of the rams of one set define a surface having the desired configuration. The rams of the other set are similarly adjusted to conform to the same surface. Preferably, the rams have work-engaging heads pivotally attached to the extremity of each ram with suitably shaped surfaces for engaging the workpiece. A sheet metal workpiece or blank is placed between the two sets of rams and sufficient force is applied to move them together to form the workpiece to the desired shape.

In this way, a curved sheet metal part is readily made merely by positioning the rams to define the desired configuration. The same machine can be used for producing different parts of any desired shapes by resetting the rams which can readily be made by a suitably programmed computer or microprocessor. The cost of expensive hand-made dies is thus eliminated and one or few pieces of a given configuration can readily be produced at reasonable unit cost.

BRIEF DESCRIPTION OF THE DRAWINGS

The invention will be more fully understood from the following detailed description, taken in connection with the accompanying drawings, in which:

FIG. 3 is a view, in elevation, of a single ram;

FIG. 4 is a top view showing a work-engaging head;

FIG. 6 is a schematic diagram illustrating the control of the machine.

DESCRIPTION OF THE PREFERRED EMBODIMENT

The present invention is based on the deformation or shaping of sheet metal by vertically movable rams. If a piece of sheet metal is clamped around the edges, for example, so as to be held in place, and a hydraulic or other type of jack is used to force a ram vertically upward into the sheet metal, the sheet will be displaced or deformed, and if it is displaced sufficiently to be stretched beyond its yield point, permanent deformation of the sheet will result. The present invention uses a set of such rams, preferably in cooperation with an opposing set of rams, to deform a sheet metal workpiece to a desired configuration which may involve complex three-dimensional curves or any other desired shape. The sets of rams thus function in essentially the same manner as conventional dies but at much lower cost.

Figure 1:
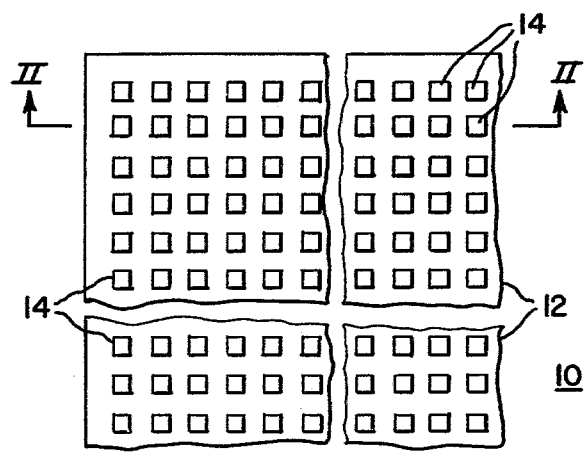
FIG. 1 is a fragmentary plan view of a lower ram unit embodying the invention.
Figure 2:
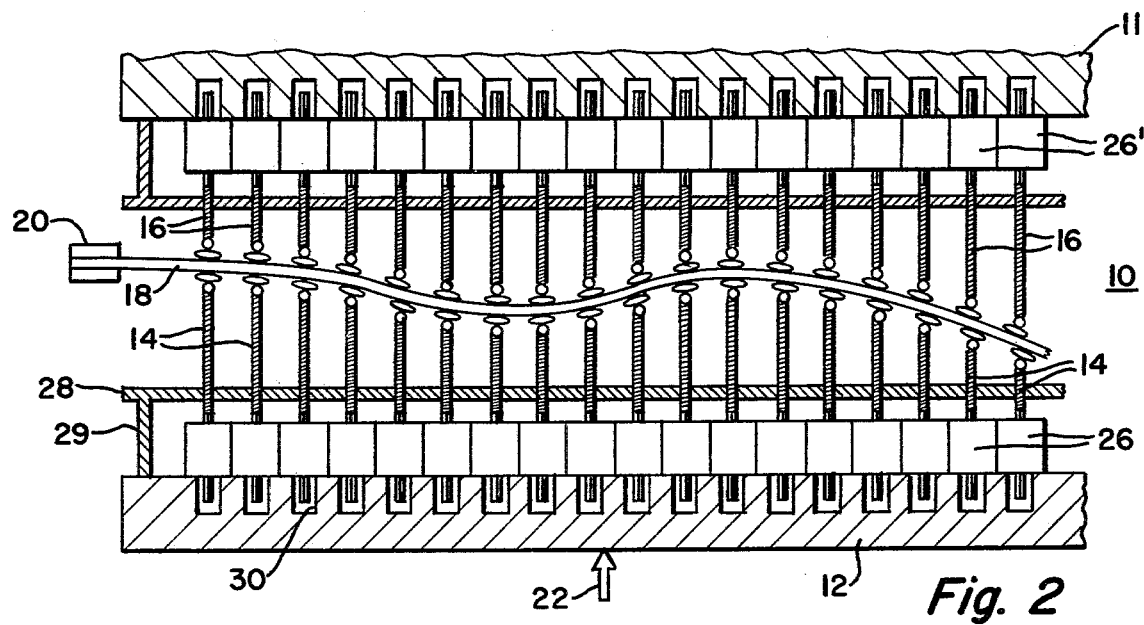
FIG. 2 is a transverse sectional view substantially on the line II—II of FIG. 1.

FIGS. 1 and 2 show somewhat diagrammatically an illustrative embodiment of the invention. The machine 10 there shown comprised upper and lower support members 11 and 12 which may be of any desired construction and which are disposed in spaced, opposed positions as shown. At least one of the support members is movable towards and away from the other one or, if desired, both members might be made movable. A first set of rams 14 is carried on the lower support 12 and the rams are arranged in a matrix array as shown in FIG. 1. Any desired or necessary number of rams 14 may be utilized, with any desired spacing between the rams in each row and between the rows, depending on the size and nature of the parts to be produced and the desired accuracy. A second set of rams 16 is carried on the upper support member 11 extending downwardly therefrom. The upper set of rams 16 includes the same number of rams as those of the lower set arranged in a corresponding pattern or array. The rams of each set can be substantially aligned with the corresponding rams of the other set as shown in FIG. 2 or can be out of alignment, depending upon requirements. The rams 14 of the lower set are individually vertically movable, as described hereinafter, and the corresponding rams 16 of the upper set are also individually vertically movable.

In the use of the machine, the rams 14 are individually positioned such that their upper extremities define a surface having the configuration to which a workpiece is to be formed, as shown, for example, in FIG. 2. The upper set of rams 16 is similarly positioned to conform to the same surface. The two sets of rams are separated and a workpiece 18, which may be a sheet metal blank, is placed between the two sets of rams with one or both edges clamped by suitable clamps 20, if necessary or desired. The supports 11 and 12 are then moved together to force the rams 14 and 16 into engagement with the workpiece 18 and sufficient force is applied, as indicated at 22, to form the workpiece to the desired configuration. Thus, the two sets of individually positioned rams function in essentially the same manner as the conventional male and female dies to form the workpiece.

The rams may be made vertically movable by any desired means, such as hydraulic jacks, and may be of any desired construction. A preferred construction for at least the rams 14 is shown, however, in FIG. 3. As there shown, the ram 14 has an upper threaded portion 24 and a non-circular lower portion 25, which may be hexagonal or square, for example. The ram is actuated by an individual electric motor 26, preferably a stepping motor or a motor with position feedback, which is secured on the support member 12. The shaft or non-circular portion 25 of the ram passes through the rotor of the motor 26 to be driven by the motor and is free to move axially. A rigid frame member 28 is provided which is mounted on the support member 12 by any suitable means, as indicated at 29 (FIG. 2), and the threaded portion 24 of each of the rams 14 is engaged in a threaded opening in the frame member 28. Thus, when the ram is rotated by the motor 26, it moves vertically upward or downward, a suitable recess or opening 30 being provided in the support 12 to receive the lower end of the ram. Each of the rams 14 is provided with a motor 26, so that each ram can be individually positioned to bring its upper extremity to a desired height above the support 12. The upper extremities of all the rams 14, therefore, define a surface which can be made to have any desired configuration by properly positioning the rams.

The upper set of rams 16 is shown in FIG. 2 as being of the same construction as the lower rams 14, with individual stepping motors 26', and arranged identically to the lower rams except that they are inverted in position to extend downwardly. The upper set of rams 16 can thus be individually adjusted to bring their extremities into position to conform to the same surface as that defined by the lower set of rams, so that the two sets of rams cooperate to form the workpiece. If desired, hydraulic or other means might be used to position the upper rams 16 instead of the motors shown. If this is done, the lower rams 14 are first positioned as described and the upper rams 16 may be positioned or then moved downward until each ram contacts the corresponding lower ram. In some cases only the lower set of rams 14 may be used, and other suitable means can be provided to force the workpiece against the lower set of rams to form it to the desired shape. In most cases, however, the use of two sets of rams as shown will be preferable.

Figure 5:
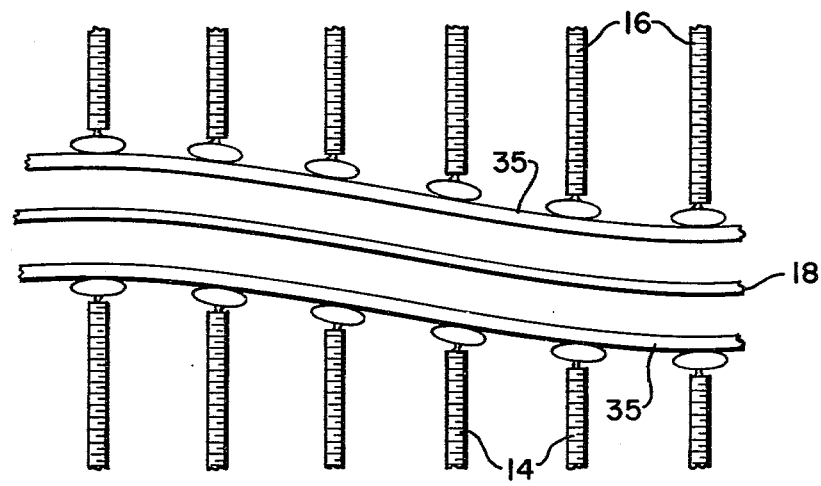
FIG. 5 is a somewhat diagrammatic view of a plurality of rams, showing a slightly modified embodiment.

The surface appearance or finish of the workpiece after forming is determined by the engaging surfaces of the rams. In order to prevent tearing of the metal and to provide a reasonably smooth finish, the heads of the rams are preferably suitably contoured. For this purpose, each ram is provided with a work-engaging head 32 which has a smooth, rounded surface as shown in FIG. 3 and which is of suitable size and shape to extend reasonably close to the heads of the adjacent rams. The head 32 is preferably pivotally mounted on the upper end of the ram by means of a ball joint 33 which allows the head to move and adjust itself to the position and direction of the workpiece. The heads 32 may be generally hexagonal, as shown in FIG. 4, or they may be of any other desired shape to minimize the gaps between adjacent heads. The number and spacing of the rams 14 and 16, and the shape and size of the ram heads 32 can, of course, be varied as necessary to produce the required finish on the workpiece. In some cases, where a very smooth or fine finish is necessary, a continuous flexible mat or sheet 35 can be placed between each set of rams and the workpiece 18, as shown in FIG. 5. This may be a woven metal mat or it may be a plastic or rubber sheet of suitable finish and sufficiently flexible to conform to the shape of the workpiece. Such a mat distributes the load between the ram heads and prevents direct metal-to-metal contact between the ram heads and the workpiece, so that a very smooth finish can be obtained. The flexible sheet 35 may be placed on the ram heads as shown, or it may be attached to the ram heads in any suitable manner, either temporarily or permanently, if desired.

It will be appreciated that only row of rams 14 and 16 is shown in FIGS. 2 and 5 extending in one direction, a complete matrix as shown in FIG. 1 extends in two directions. In this way, three-dimensional configurations can be achieved by positioning the rams in other rows at other positions with respect to supports 11 and 12. Normally, the rams in successive rows will be positioned so as to produce a smooth contour in the workpiece 18 as it progresses into or out of the plane of the drawing of FIG. 2, for example.

In the use of this machine, the individual rams extending in two directions are positioned as described above to produce the desired configuration in the finished workpiece. After use, the machine can easily be changed for the production of another different sheet metal part merely by repositioning the individual rams to define the desired new surface configuration for the new part. Thus, one or a few parts of a given shape can be produced without excessive cost as the same machine can be quickly and easily readjusted for another part. This machine, therefore, lends itself well to operation by a suitably programmed computer. This is illustrated diagrammatically in FIG. 6. As there indicated, the X-Y-Z coordinates of each point in the matrix of rams are determined from the drawings of the part to be made and fed into a suitably programmed data processor or computer, preferably a microprocessor 38. The microprocessor 38 provides input signals to a motor control 39 of any suitable type which supplies a series of pulses to each of the individual stepping motors 26 and 26' to adjust the various rams to the proper heights to establish the surface defined by the coordinates supplied to the system. The processor 38 preferably also controls the application of load, as indicated at 40, to one or both of the supports 11 and 12 to force the rams into the workpiece to form the workpiece to the desired shape. After completion of the desired number of parts, the machine can be immediately reset for a different part by inserting a new set of coordinates, or the machine can be programmed to change to various sets of stored coordinates.

Operation of the machine may also be facilitated in some cases by the use of contact switches on the rams of one or both sets. Thus, as shown in FIG. 3, a normally-closed switch 41 may be carried on the upper end of each ram 14 and actuated by a link 42 attached to the head 32. Upon contact of the head 32 with a fixed object such as a workpiece, the switch 41 is immediately opened. The switches 41, as indicated in FIG. 6, are preferably connected in the circuits of the corresponding motors 26 or 26', so that as soon as the head of each ram contacts another object, movement of the ram is stopped. This arrangement may be used, for example, to duplicate an existing part by placing it between the two sets of rams and allowing them to move until contact with the part stops each ram in the proper position to establish the desired configuration to produce duplicate parts. The coordinates thus determined could also be stored for future use. The provision of contact switches on one set of rams only could also facilitate setting up the machine since the first set of rams could be positioned as previously described to establish the coordinates of the part to be produced and the second set of rams could then be positioned merely by allowing them to move until their respective contact switches stop them when they contact the corresponding rams of the first set. The processor 38 would then need to be programmed for only the first set of rams.

It will now be apparent that an apparatus has been provided for forming sheet metal parts which eliminates the necessity of the conventional expensive hand-made dies, so that only one or a few identical parts can be economically and accurately produced. The apparatus shown lends itself to the use of a programmed microprocessor, or similar device, for properly positioning the rams but it will be obvious that they might be positioned in other ways and other types of rams such as hydraulic rams could be utilized, if desired, rather than motor-driven rams. The apparatus is, of course, not limited to forming sheet metal as it could be used for any suitable material. For example, the ram heads, or a mat carried by them, could be heated and thus adapt the machine for forming thermoplastic sheets to a desired shape.

I claim as my invention:

1. Apparatus for forming sheet metal comprising two opposed support members, a first set of movable rams disposed in a matrix array on one of said support members, a second set of movable rams disposed on the other of said support members in positions corresponding to the rams of the first set, each ram of one set being substantially in alignment with a ram of the other set, all of said rams having work-engaging heads thereon, means for individually positioning the rams of one set so that their heads define a surface of predetermined configuration, means for positioning the rams of the other set so that their heads conform to said surface, the heads being adapted to engage a workpiece placed between the two sets of rams, an individual motor for each of said rams for effecting movement of the ram, control means for actuating said motors to position the rams to establish said predetermined configuration, and means for applying a force to at least one set of rams to form the workpiece to the shape of said surface.

2. Apparatus as defined in claim 1 in which said work-engaging heads have rounded surfaces and are connected to the rams by ball joints.

3. Apparatus as defined in claim 2 and including a continuous flexible sheet disposed between each set of rams and the workpiece.

4. Apparatus as defined in claim 1 in which each ram has a threaded portion, a frame fixed relative to each support member, the threaded portions of the rams engaging in internally-threaded openings in said frames, and said motors being connected to rotate the respective rams to effect vertical movement.

5. Apparatus as defined in claim 1 in which each of the ram heads of at least one of said sets includes normally-closed switch means connected to control the motor of its ram, the switch means being adapted to open upon contact of the head with a stationary object.

* * * * *